UNITED STATES PATENT OFFICE.

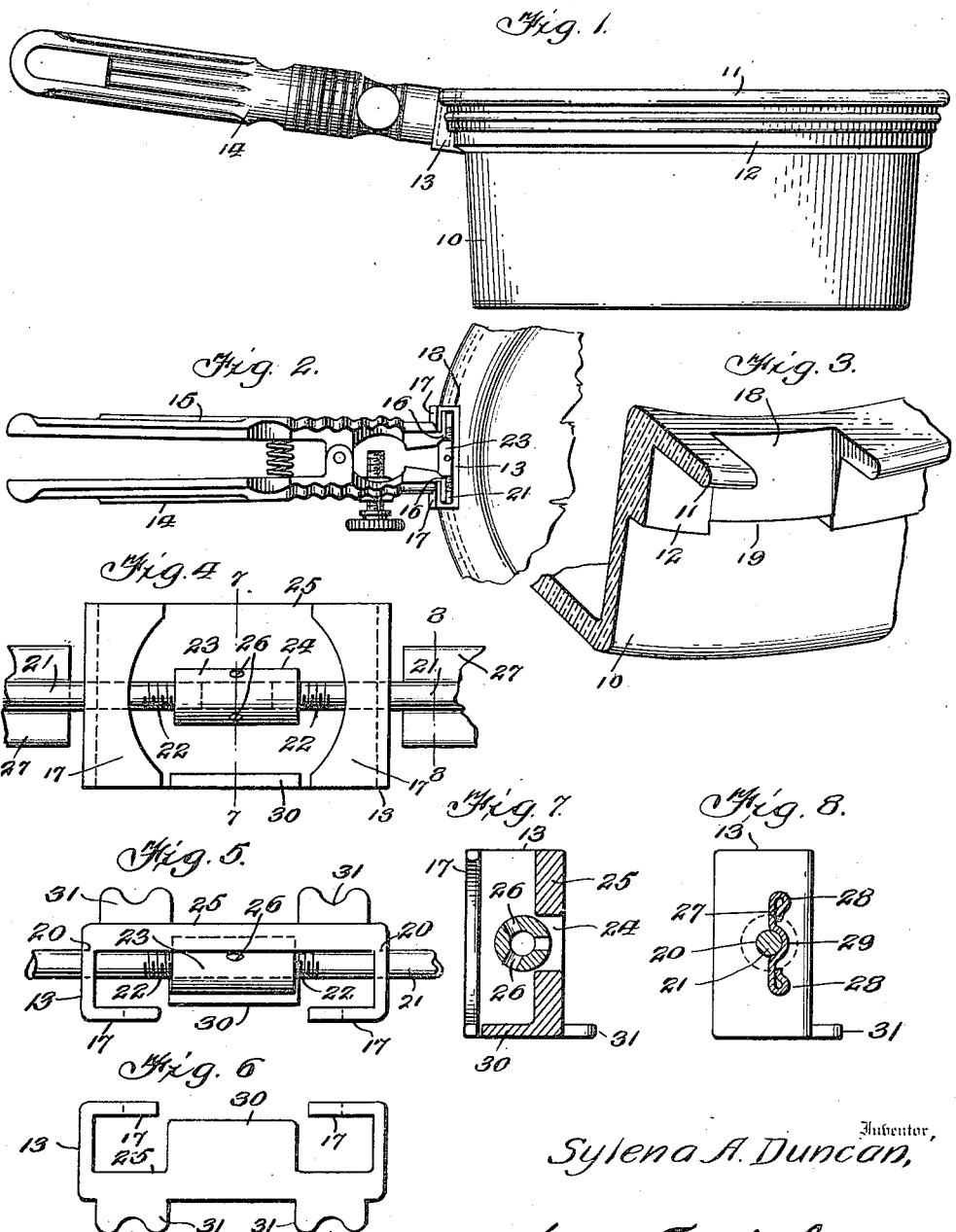

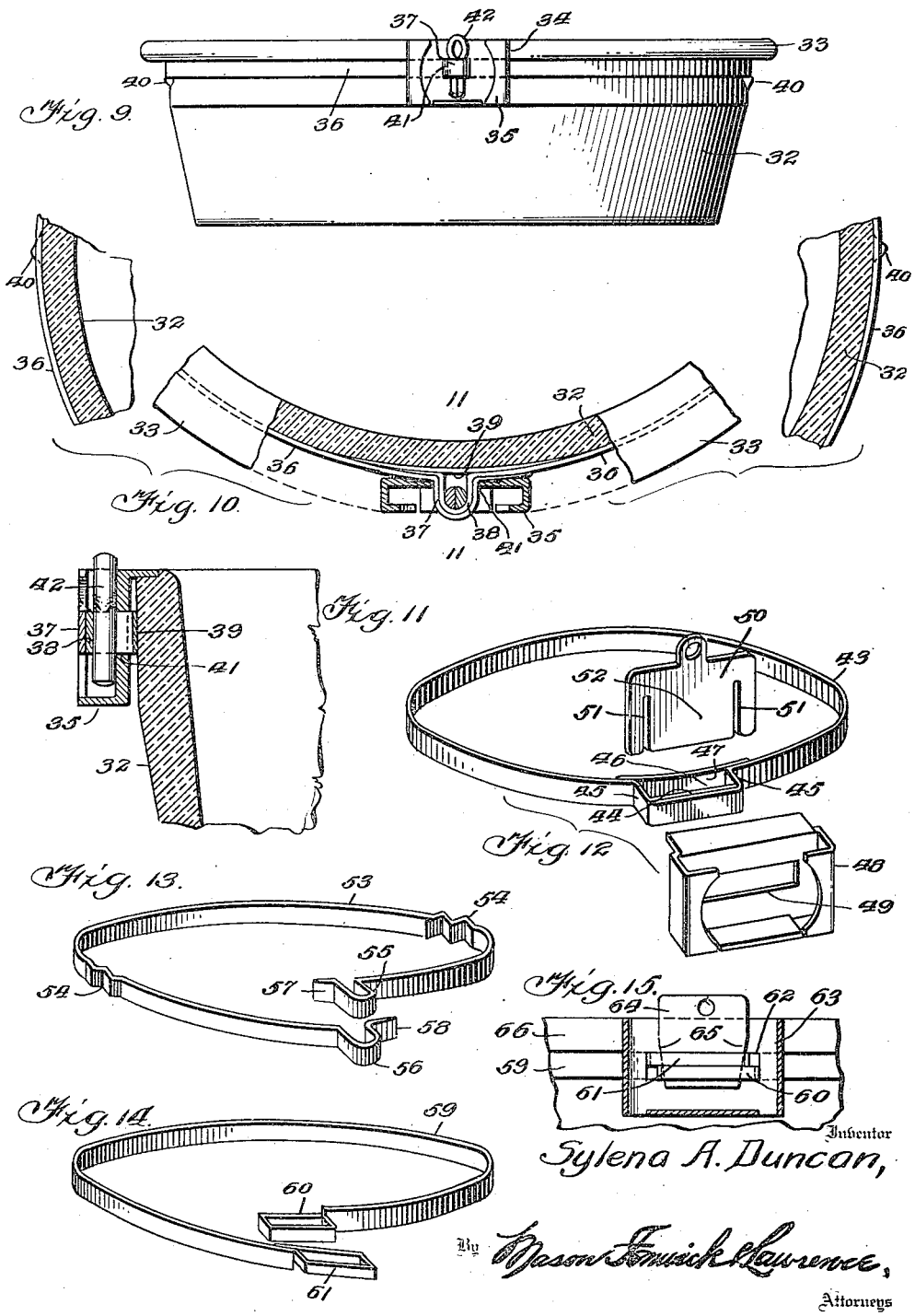

SYLENA A. DUNCAN, OF NESHANIC STATION, NEW JERSEY.

SUPPORT FOR DETACHABLE HANDLES.

1,282,552.  Specification of Letters Patent.  Patented Oct. 22, 1918.

Application filed November 2, 1916.  Serial No. 129,190.

*To all whom it may concern:*

Be it known that I, SYLENA A. DUNCAN, a citizen of the United States, residing at Neshanic Station, in the county of Somerset and State of New Jersey, have invented certain new and useful Improvements in Supports for Detachable Handles; and I do hereby declare the following to be a full, clear, and exact description of the invention, such as will enable others skilled in the art to which it appertains to make and use the same.

This invention relates to supports for detachable handles for cooking utensils and the like.

It has for an object to provide a means for attaching a handle socket to a vessel such as a cooking utensil of a non-metallic or vitreous nature.

A further object is to provide an interlocking of said handle socket to the vessel, so that when once applied, it cannot be accidentally removed therefrom.

A further object of this invention is the provision of a handle socket which may be easily removed from the vessel when so desired to thoroughly clean the vessel and associated parts.

Further objects will be apparent from the following specification, appended claims and drawings, in which, Figure 1 is a side elevation of a cooking utensil showing one form of handle socket attached thereto, Fig. 2 is a plan view of portions shown in Fig. 1, Fig. 3 is a perspective view of a small portion of the vessel showing its preparation for the reception of the handle socket, Fig. 4 is a front elevation of the socket detached, Fig. 5 is a plan view thereof, Fig. 6 is a bottom view thereof, Fig. 7 is a sectional view as on the line 7—7 of Fig. 4, Fig. 8 is a similar view as on the line 8—8 of Fig. 4, Fig. 9 is an elevation of a vessel having a modified form of socket thereon, Fig. 10 is a composite horizontal, sectional and plan view of parts shown in Fig. 9, Fig. 11 is a cross sectional view as on the line 11—11 of Fig. 10, Fig. 12 is a perspective view of parts of a further modified form, Fig. 13 is a similar view of a modified form of socket supporting band, Fig. 14 is a similar view of a further modified form of band, and Fig. 15 shows how the band in Fig. 14 is securely gripped about a vessel.

This invention has for its preferred adaptation the fastening of a metallic or other handle socket to a cooking utensil which may be made of a non-metallic substance such as earthen-ware or other vitreous substances and it also permits the removal of the socket when so desired, as for cleaning purposes.

Referring to the drawings in which the several features are clearly shown and described, 10 indicates a vessel having a flange 11 about the upper edge thereof, and also having an enlarged portion 12 near the upper end to afford the necessary strength. A socket 13 is attached to the vessel and this socket is adapted to receive the gripping ends of handle members 14 and 15 which may have the outwardly directed gripping edges 16 formed thereon, to interlock behind the inturned ends 17 of the socket member 13. The handle member may be of two pieces as shown in the drawings or the socket may be slightly modified to adapt itself to any other type of detachable handles.

The flange 11 is cut away as at 18 and the enlarged portion 12 is also recessed as at 19 to permit the socket member 13 being compactly attached to the vessel. The socket member 13 has passages 20 formed in the ends thereof to receive the ends of the wire 21 which are threaded as at 22 and are engageable with internally threaded sockets formed in the turn-buckle 23 and this turn-buckle partly fits in a recess 24 formed in the back wall 25 of the socket member 13. This turn-buckle has the passages 26 formed therein to permit the insertion of a pin or other manipulating means. The wire 21 may contact directly with the outer wall of the enlarged portion 12 of the vessel, but I prefer to increase the gripping action of the retaining member comprising the wire 21 by interposing a band 27 between said wire and the outer wall of the vessel. This band has its edges rolled as at 28 and has a central depression 29 formed therein, in which the wire 21 rests and it is clearly seen that by the use of the band 27, the desired frictional contact between the retaining member and wall of the vessel may be had when utilizing the resiliency of said band. The socket member 13 has the inwardly directed flanges 17 formed thereon and these flanges may be recessed as shown, to permit the detachable handle member being locked therein when so desired and to prevent said handle member passing too low when inserted in the socket, a shelf 30 is formed on the lower edge of said socket member. To establish the desired relation of said socket member to said vessel so as to give the handle member when applied, the proper pitch, lugs 31 are also formed on the lower edge of said socket member and these lugs engage in the recess 19 in the enlargement 12 to thereby cause said socket member to be inclined and to prevent said socket member being accidentally moved downwardly with respect to the wall of the vessel, the enlargement 12 and flange 11 are recessed as at 18 to present a reverse incline to this portion with regard to the taper of the wall of the vessel so that the lower edge thereof is in a line of greater circumference than the upper edge.

In Fig. 9, the vessel 32 has a flange 33 which is recessed as at 34 and the socket member 35 is supported to the outer wall of said vessel as by a band 36 which has its ends overlapped and looped as at 37 and 38, where said ends may be soldered or otherwise secured to each other. A reinforcing strip 39 may also be attached to said band as shown, to prevent the looped portions 37 and 38 being enlarged when subjected to any strains. The vessel may have lugs 40 formed thereon which prevent the downward movement of the band 36 in its contracted form. The socket member 35 has a central opening 41 formed therein, through which the loops 37 and 38 extend and after said socket member has been applied, a pin 42 may be inserted through the looped portions to thereby retain said socket member.

Fig. 12 shows a band 43 which has its ends overlapped as at 44 and these ends are offset as at 45 to form an elongated loop 46, of which the offset portions of the band may be reinforced by the supplemental strip 47 which may be secured as by soldering or otherwise at its ends to the band. A socket member 48 having an elongated opening 49 therein may then be placed over the looped portion 46, of which a plate 50, having slots 51 formed therein, may be slid in said socket member to have the central tongue 52 formed by the slots 51 pass through the looped portion 46.

Fig. 13 shows a band 53 which may have portions thereof crimped as at 54 and may have its ends looped as at 55 and 56 so that when placed about the wall of a vessel, these loops 55 and 56 may overlap each other, after which a socket member as shown in Figs. 9, 10 and 11, may then be placed over the looped portions to receive a corresponding pin to that shown at 42. The ends of the band extend beyond the looped portions as shown at 57 and 58, so that these extensions will lock against the wall of the vessel and rear face of the socket member, after the same has been applied to prevent said looped portions becoming straightened when a strain is exerted upon a socket member.

Figs. 14 and 15 show a band 59 which has its ends looped as at 60 and 61, so that said loops may overlap each other to form a composite loop and said portions of the band which form said loops will be of reduced thickness so that the composite loop is of such a size, as to pass through an opening 62 in the socket member 63, after which a pin 64 having the tapering sides 65 may be driven through the socket member through the loops 60 and 61, when the increased dimension across said pin will exert the desired tension on the ends of the band 59, to cause it to securely bind against the outer wall of a vessel 66.

Various other modifications may be made within the scope of this invention without departing from the spirit thereof and the several forms shown in the drawings herewith, are submitted for illustrative purpose only.

It is thought that the application and removal of the several forms shown in the drawings are clearly described in the foregoing description and that further description thereof is unnecessary.

Having thus described this invention, I claim:—

1. A detachable handle socket comprising in combination, a cooking utensil having a flanged shoulder about the upper edge thereof, having a recess formed therein with a reversed inclined to the outer walls of said utensil, a socket member to receive a detachable handle disposed in said recess, and a split ring encircling said utensil having the ends of said split ring enter said socket member for attachment to one another.

2. A detachable handle socket comprising in combination, a cooking utensil having a flange formed about the upper edge thereof, and having a recessed portion in said flange, a split band encircling said utensil under said flange, fasteners for the ends of said split band, a socket member to receive a detachable handle, said socket member having an opening therein to receive portions of said band and fasteners, and an overhanging portion of said socket member to engage in the recessed portions of said flange.

3. A detachable handle socket comprising in combination, a cooking utensil having a flange formed about the upper edge thereof, with a recessed portion of said flange, a socket member carried by said utensil having portions thereof disposed in said recessed portion of said flange, a split band encircling said utensil under said flange, having the ends thereof meet in said socket member, and a fastener for said meeting ends which also attaches said socket member to said band.

4. A detachable handle support comprising in combination, a cooking utensil having a flanged shoulder about the upper edge thereof, having a recess formed in said shoulder and flange with a reversed incline to that of the outer walls of said utensil, a socket member to receive a detachable handle disposed in said recess, being pitched by said recess to position the inserted handle in an upwardly inclined position, a split ring encircling said utensil, being detachably mounted, said split ring having provision for adapting itself to uneven sizes of utensils, said split ring having its end enter said socket member, and fasteners detachably carried by said socket member for uniting the ends of said split ring to securely lock said split ring to said utensil and thereby hold said socket member securely to said utensil.

In testimony whereof I affix my signature in presence of two witnesses.

SYLENA A. DUNCAN.

Witnesses:
WILLIAM B. HALL,
ELIZABETH SPELLACY.